United States Patent
Lee et al.

(10) Patent No.: US 6,721,351 B1
(45) Date of Patent: Apr. 13, 2004

(54) HANDOFF SUPPORTING APPARATUS AND METHOD IN CDMA COMMUNICATION SYSTEM SUPPORTING MULTI-FREQUENCY ASSIGNMENT

(75) Inventors: Jun-Sung Lee, Seoul (KR); Hye-Ki Oh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 09/526,009

(22) Filed: Mar. 15, 2000

(30) Foreign Application Priority Data

Mar. 16, 1999 (KR) .......................................... 1999-8711

(51) Int. Cl.$^7$ .............................................. H04B 1/713
(52) U.S. Cl. ...................................... 375/138; 455/442
(58) Field of Search ................................ 375/138, 130, 375/376; 455/436, 437, 439, 442, 443, 444; 370/329, 330, 331

(56) References Cited

U.S. PATENT DOCUMENTS 5,680,395 A * 10/1997 Weaver et al. .............. 375/141
6,188,906 B1 * 2/2001 Lim et al. .................... 370/331
6,208,860 B1 * 3/2001 Kim et al. .................... 455/440
6,292,652 B1 * 9/2001 Kim .............................. 455/20

* cited by examiner

Primary Examiner—Khai Tran
Assistant Examiner—Khanh Cong Tran
(74) Attorney, Agent, or Firm—Cha & Reiter, L.L.C.

(57) ABSTRACT

An apparatus for producing a plurality of pilot signals corresponding to a multi-frequency assignment (FA) of a small-capacity base transceiver station supporting only the primary frequency assignment (FA1) to perform a hand-off in a CDMA communication system which supports the multi-frequency assignment (FA). The apparatus includes a first phase locked loop (PLL) synthesizer having a first PLL for synthesizing the primary frequency assignment (FA1) signal by controlling the first PLL, a second PLL synthesizer having a second PLL for synthesizing the multi-frequency assignment (FA) signals by controlling the second PLL, and an up-converter for modulating the transmission data with the primary frequency assignment signal provided from the first PLL synthesizer and producing the pilot signals corresponding to the multi-frequency assignment by modulating a signal, prior to RF modulation, with the multi-frequency assignment signals provided from the second PLL synthesizer.

14 Claims, 5 Drawing Sheets the present invention relates to a handoff supporting apparatus and method in CDMA communication system supporting multi-frequency assignment

HANDOFF SUPPORTING APPARATUS AND METHOD IN CDMA COMMUNICATION SYSTEM SUPPORTING MULTI-FREQUENCY ASSIGNMENT

CLAIM OF PRIORITY

This application makes reference to, incorporates the same herein, and claims all benefits accruing under 35 U.S.C. Section 119 from an application for HANDOFF SUPPORTING APPARATUS AND METHOD IN CDMA COMMUNICATION SYSTEM SUPPORTING MULTI-FREQUENCY ASSIGNMENT filed earlier in the Korean Industrial Property Office on Mar. 16, 1999 and there duly assigned Serial No. 8711/1999.

BACKGROUND OF THE INVENTION

1. Field of the Invention

The present invention relates to a handoff supporting apparatus and method in a code division multiple access (CDMA) communication system which supports the multi-frequency assignment, and more particularly to an apparatus and method for supporting the hand-off involving the multi-frequency assignment to a pico base transceiver station (BTS).

2. Description of the Related Art

An outdoor pico-base transceiver station (BTS) is normally installed in a special area such as downtown, a microcell, a local road, or a district town as a small-capacity BTS for serving the area where a small number of subscribers exist. The pico-BTS is implemented since it is difficult to have an effective arrangement of the BTS for the whole service area using only the large-capacity BTSs. However, the pico BTS currently implemented in the service cannot provide a multi-frequency assignment (multi-FA) service. Thus, a call which is not tuned to a primary frequency assignment, but to other frequency assignment coming from the neighboring BTSs, is always disconnected upon entering the pico-BTS area.

FIG. 1 is the circuit diagram of a transmitter in the conventional pico-BTS. Referring to FIG. 1, the transmitter includes a phase locked loop (PLL) synthesizer 1 for synthesizing the frequency FA1 under the control of the input terminal signal of an PLL, and an up-converter 2 for modulating the transmission data at the frequency FA1 synthesized by the PLL synthesizer 1.

The PLL synthesizer 1 synthesizes the corresponding frequency using the input signals of CLOCK, DATA, STROBE, AND REFERENCE of the PLL provided therein, and the up-converter 2 receives the frequencies synthesized by the PLL synthesizer 1 to modulate the transmission data accordingly. Meanwhile, the frequency signal filtered by a band pass filter (BPF) provided in the up-converter 2 is inputted and amplified by a power amplifier to be transmitted through an antenna.

FIG. 2 depicts a block diagram illustrating the construction of the conventional frequency assignment (1FA) system. In FIG. 2, the conventional 1FA system comprises a pico-cell main unit (PMU) 10 and a pico-cell radio unit (PRU) 20. According to the conventional 1FA system, a maximum spacing distance of 100 m is possible between the PMU 10 and the PRU 20. Moreover, one PRU 20 is required when the cell is provided with 1FA/Omni, two PRUs 20 are required in the case of 1FA/2sec, and three PRUs 20 are required in the case of 1FA/3sec. Currently, in the case of constructing the 1FA/OMni system, a modification up to 3FA/Omni is possible but not over 4FA.

FIG. 3 depicts a view illustrating the result of handoffs according to the conventional system. FIG. 3 illustrates that all mobile terminals, except for the mobile terminal having the primary frequency assignment, experience call disconnection due to the lack of frequency assignment when they enter from the ground level to the underground level. For example, if a mobile station tuned to the frequencies 2FA and 3FA but not to the primary frequency (1FA) moves from the ground level to the subway level, call disconnection is unavoidable as the pico-BTS installed in the subway only supports the primary frequency FA1.

As described above, as the conventional pico-BTS only supports the service in the primary frequency assignment, any mobile terminal with a different frequency assignment experiences a call disconnection when the terminal moves to the underground area or specific topography.

SUMMARY OF THE INVENTION

Accordingly, the present invention has been made in an effort to solve the problems occurring in the related art, and an object of the present invention is to provide a hand-off supporting apparatus and method in the code division multiple access (CDMA) communication system for supporting a multi-frequency hand-off to a small-capacity base transceiver station which only supports the primary frequency assignment.

Another object of the present invention is to provide an apparatus and method in the CDMA communication system which enables the small-capacity base transceiver station to transmit the frequency signals other than the primary frequency in a time hopping mode.

In order to achieve the above objects, according to the present invention, there is provided an apparatus for a small-capacity BTS having only the primary frequency assignment in the CDMA system which provides the pilot signals corresponding to a multi-frequency assignment (FA). The apparatus includes a first phase locked loop (PLL) synthesizer having a first PLL for synthesizing the primary frequency assignment (FA1) signal by controlling the first PLL; a second PLL synthesizer having a second PLL for synthesizing the multi-frequency assignment (FA) signals by controlling the second PLL; and, an up-converter for modulating the transmission data with the primary frequency assignment signal provided from the first PLL synthesizer, and for producing pilot signals according to the multi-frequency assignment and modulating the received signal with the multi-frequency assignment signals provided from the second PLL synthesizer prior to the RF modulation.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in greater detail to the preferred embodiments of the present invention. In the following description of the present invention, many specified items are indicated only for the better understanding of the present invention, thus it will be understood by those skilled in the art that the present invention can be performed without such specified items. For the purpose of clarity, a detailed description of known functions and configurations incorporated herein will be omitted as it may make the subject matter of the present invention unclear.

Figure 1:
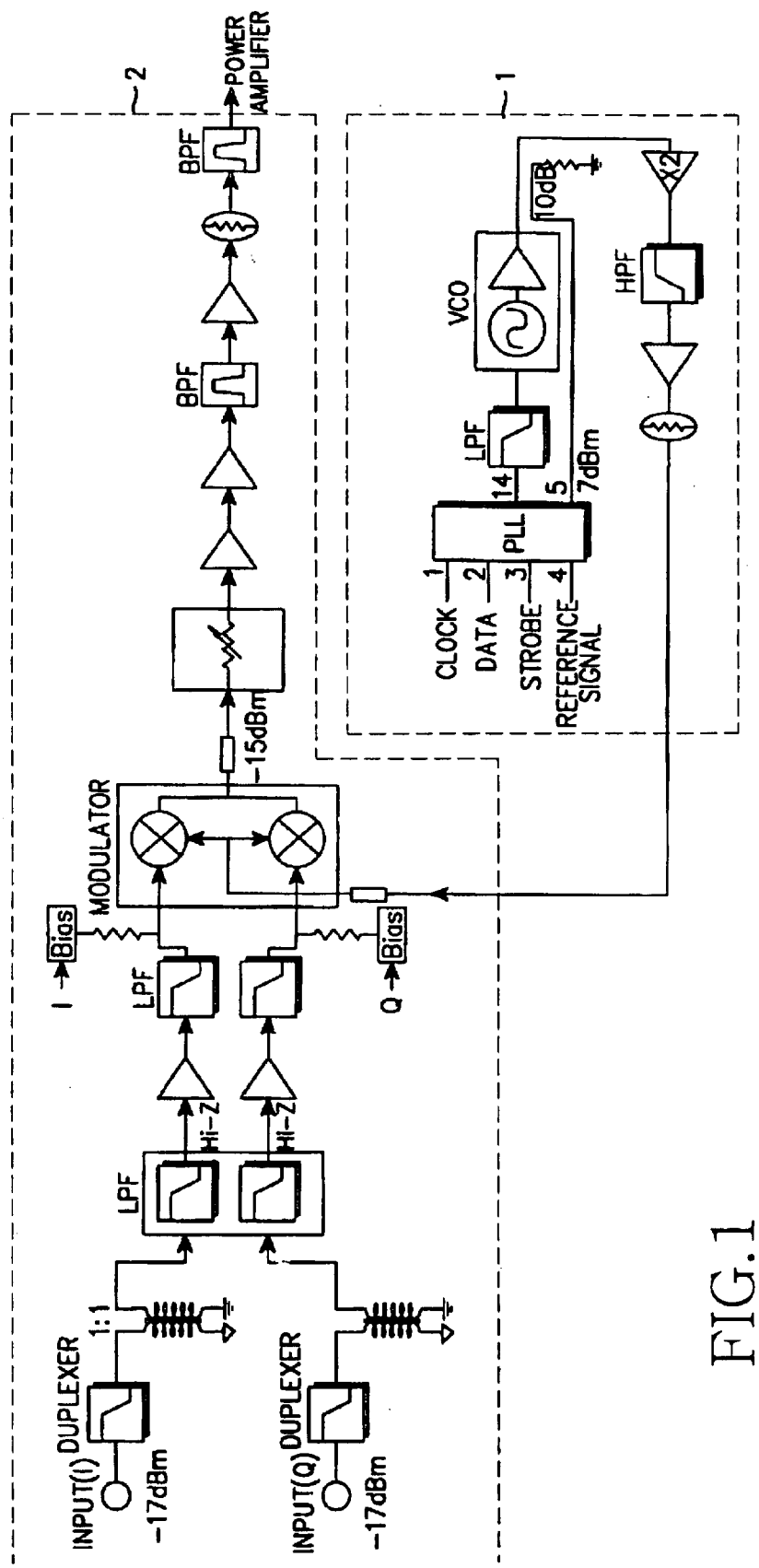
FIG. 1 is a circuit diagram of a transmitter in a conventional pico base transceiver station.
Figure 2:
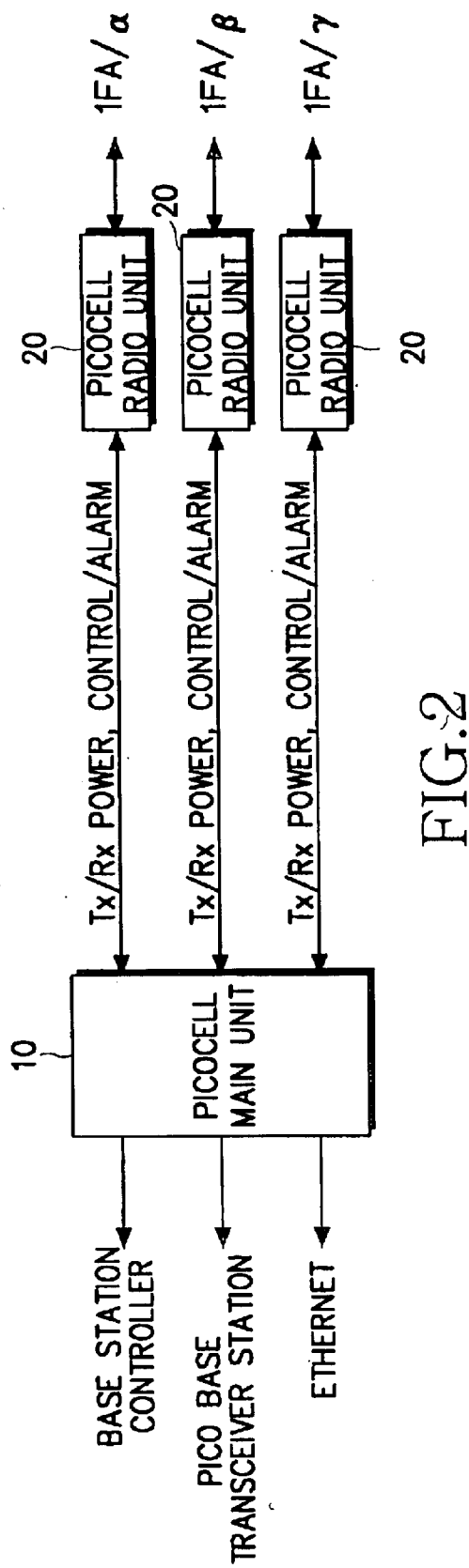
FIG. 2 is a block diagram illustrating the construction of the conventional frequency assignment (1FA) system.
Figure 3:
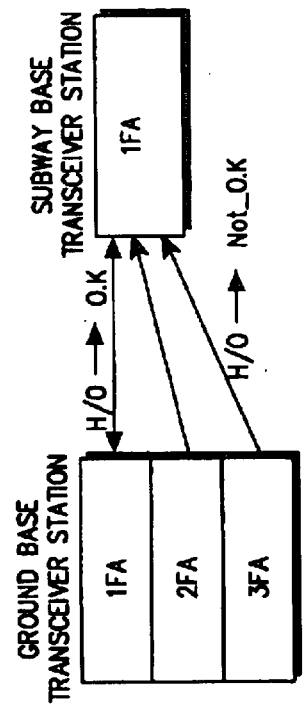
FIG. 3 is a view illustrating the hand-off result in the conventional system.
Figure 4:
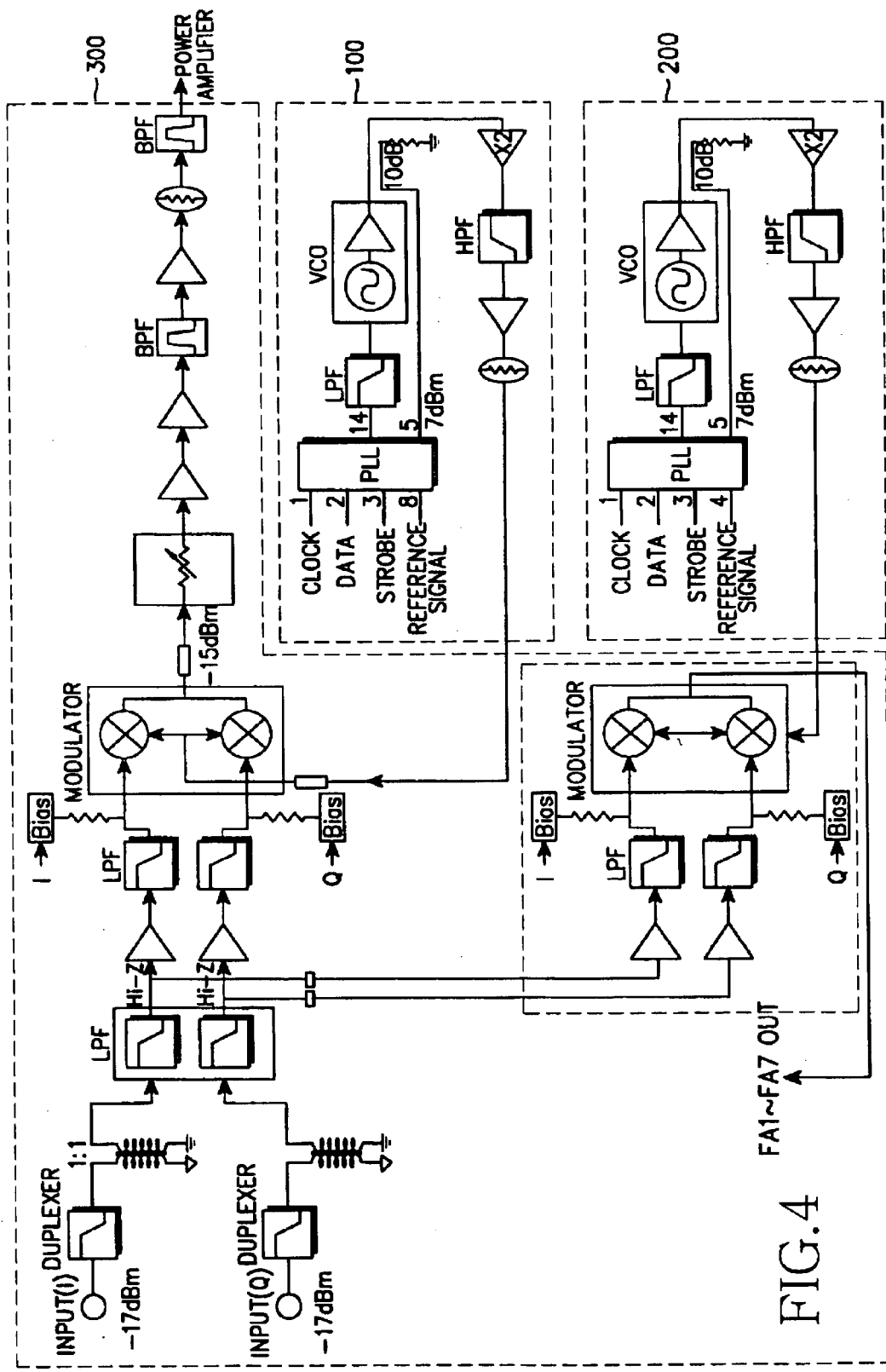
FIG. 4 is a circuit diagram of a transmitter in a pico base transceiver station according to the present invention.

FIG. 4 is a circuit diagram of a transmitter in a pico base transceiver station in accordance with the present invention. In FIG. 4, the transmitter according to the present invention includes a first phase locked loop (PLL) synthesizer 100 for synthesizing a frequency (FA1) according to the input terminal signal at the PLL; a second PLL synthesizer 200 for synthesizing other frequencies (FA2~FA7) in a time hopping manner according to the input terminal signal of the PLL; and, an up-converter 300 for modulating the transmission data with the synthesized frequency (FA1) of the first PLL synthesizer 100 and for producing the corresponding pilot signals to the synthesized frequencies (FA2~FA7) generated by the second PLL synthesizer 200.

The first PLL synthesizer 100 synthesizes the primary frequency (FA1) in response to the input signals of CLK, DATA, STROBE, REF provided therein. The second PLL synthesizer 200 synthesizes other frequencies (FA2~FA7) in a time hopping manner in response to the input signals of CLK, DATA, STROBE, REF of the PLL provided therein. The up-converter 300 receives the frequencies synthesized by the first PLL synthesizer 100 and modulates the transmission data accordingly. The up-converter 300 produces the corresponding pilot signals to the frequencies (FA2~FA7) synthesized by the second PLL synthesizer 200. The pilot signals contain the non-data information in the digital bit unit of 0 or 1. Thus, the pilot signals enable the mobile station to effectuate the rapid acquisition to a new multipath and the channel estimation. Also, the control of the PLL provided in the first and the second PLL synthesizers is implemented by software and performed through a separate control processor.

The I-channel signal and Q-channel signal inputted to the up-converter 300 are signals obtained by the encoding and interleaving, of the transmission data, multiplying the interleaved data by a channel discrimination code, and then multiplying the multiplied data by a base transceiver station discrimination code. The I-channel signal and the Q-channel signal are filtered through the low pass filters (LPFs), and then converted into a high-frequency signal by a modulator which multiplies the low-pass-filtered signals by the frequency provided from the first PLL synthesizer 100, respectively. The high-frequency signals are then filtered through band pass filters (BPFs), then amplified by power amplifiers to be transmitted through the antenna.

The pilot signal modulator provided in the up-counter 300 produces the pilot signals corresponding to the multi-frequency using the frequencies generated in the time hopping manner by the second PLL synthesizer 200. Then, the pilot signals which correspond to the multiple frequencies are transmitted in a time division mode.

As described above, according to the present invention, in order for the pico base transceiver station to transmit the pilot signals in the multiple frequencies which are used to generate pilot strength measurement message for determining the type of handoff, a separate transceiver board (i.e., the second PLL synthesizer 200) is provided in the pico-cell radio unit (PRU), so that the hard hand-off is supported with respect to the call coming from the neighboring base transceiver station, which is tuned to the frequency other than the primary frequency (FA).

If the circuit as shown in FIG. 4 is implemented on the transmission (Tx) path of the PRU, the output frequencies are in the range of 869~894 MHz and in the range of 1840~1860 MHz (based on the frequency assignment by the DCS/PCS service provider), and the number of channels is in the range of 1~7FA. Also, the output voltage is 0 dBm/FA, the ripple between channels is 0.5 dB, and the gain control is in the range of 20~30 dB (TBD).

According to the present invention, the pilot signals for the multi-frequency assignment is received by the modification of the transceiver board in the pico base transceiver station, the pilot signals are transmitted for performing the frequency assignment other than the primary frequency assignment by using the PLL synthesizer operating in the time hopping manner, and thus the transmission of other frequency assignment signal is possible. Specifically, the signal prior to the RF modulation is extracted, and the pilot signals for the respective frequency assignment are transmitted in the time division manner through the separate path of a second PLL synthesizer circuit operating in the time hopping manner. Here, the synthesizer produces the respective frequency assignment in the time hopping manner in response to the input data, clock, strobe, and reference signals.

Figure 5:
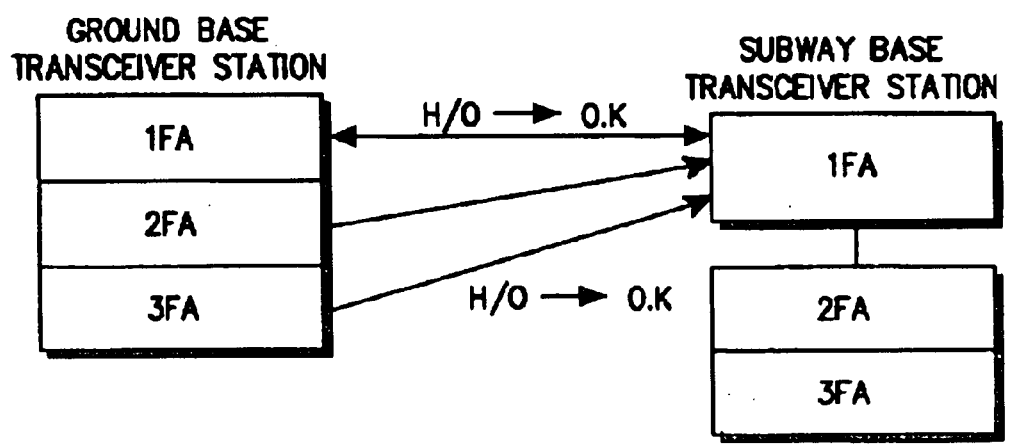
FIG. 5 is a view illustrating the hand-off result according to the present invention; and, FIG. 6 is a view illustrating the service mode of the ground level and the underground level according to the present invention.

FIG. 5 is a view illustrating the hand-off result according to the present invention. Referring to FIG. 5, as the pico base transceiver station located in the subway transmits the respective frequency assignment in the time hopping manner, the call tuned to the frequency assignment other than the primary frequency assignment of the ground base transceiver station can be hand-off to the pico base transceiver station.

Figure 6:
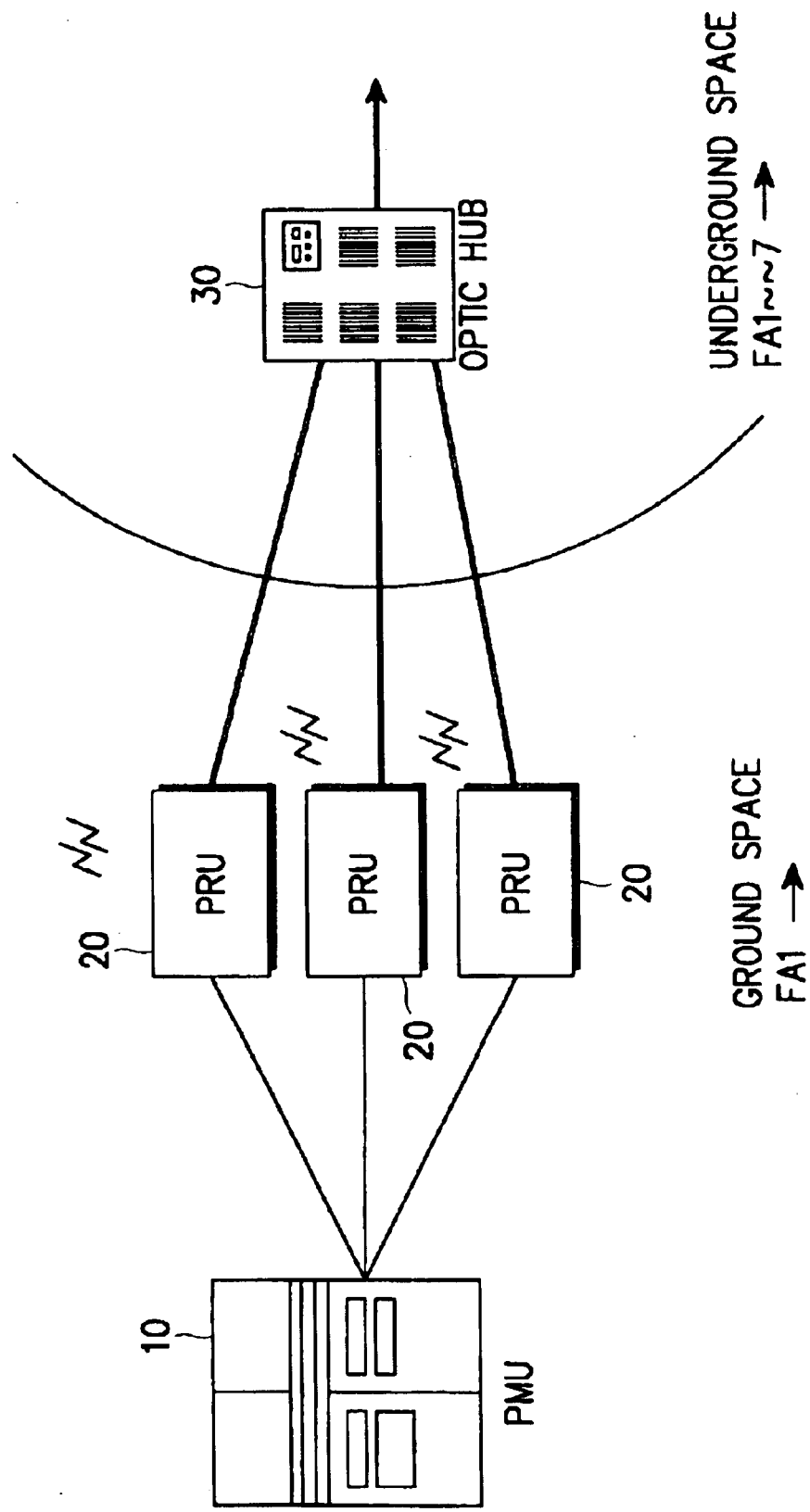

FIG. 6 is a view illustrating the service state on the ground and the underground state according to the present invention. Referring to FIG. 6, a pico-cell main unit (PMU) 10 and a plurality of picocell radio units (PRUs) 20 connected to the PMU are provided on the ground state, and an optical hub 30 is provided in the underground state. In this case, the pico-cell radio unit 20 produces the frequency of FA1~FA7 in a variable time hopping manner and thus can support the smooth hand-off with respect to the call coming to the ground. According to the present invention, the pilot signals which can support the hand-off for the multi-frequency assignment can be transmitted by adding a circuit to the transceiver of the existing pico-base transceiver station; thus, it is necessary to install any additional system.

As described above, according to the present invention, the pilot signals providing the multi-frequency assignment signals are transmitted to the small-capacity base transceiver station supporting only the primary frequency assignment in the code division multiple access (CDMA) communication system, thus even if the call tuned to the frequency assignment other than the primary frequency assignment comes from the neighboring base transceiver station, the call can smoothly achieve the hand-off thereby providing reliable service to the user. Also, the small-capacity base transceiver station can produce the pilot signals for the multi-frequency assignment by slightly modifying the existing circuits in the transboard, without requiring a separate pilot transmitter and increasing the operating cost.

While this invention has been described in connection with what is presently considered the most practical and preferred embodiments, it is to be understood that the invention is not limited to the disclosed embodiment, but, on the contrary, it is intended to cover various modifications within the spirit and the scope of the appended claims.

What is claimed is:

1. A transmitter of a base transceiver station (BTS) also having a receiver, said transmitter for producing a plurality of pilot signals corresponding to a multi-frequency assignment (FA) to execute a hand-off in a small-capacity (BTS) which only supports a primary frequency assignment (FA1) in a CDMA communication system which supports said multi-frequency assignment, said transmitter comprising:

a first phase locked loop (PLL) synthesizer having a first PLL for synthesizing said primary frequency assignment (FA1) signal by controlling said first PLL;

a second PLL synthesizer having a second PLL for synthesizing said multi-frequency assignment (FA) signals by controlling said second PLL; and, an up-converter for modulating transmission data with said primary frequency assignment signal provided from said first PLL synthesizer, and for producing pilot signals corresponding to said multi-frequency assignment by modulating a signal, prior to radio frequency modulation, with said multi-frequency assignment signals provided from said second PLL synthesizer, said transmitter being operable to transmit the modulated transmission data and said pilot signals.

2. The transmitter as claimed in claim 1, wherein said pilot signals from said up-converter are transmitted in a time division manner.

3. A handoff supporting apparatus of a CDMA communication system supporting a multi-frequency assignment, comprising:

a large-capacity base transceiver station (BTS) for supporting said multi-frequency assignment; and, a small-capacity base transceiver station (BTS) for supporting a primary frequency assignment (FA1) signal as a carrier signal, said small-capacity BTS generating a plurality of pilot signals in a time division manner corresponding to different carrier signals, wherein said large-capacity BTS performs a hand-off to said small-capacity BTS.

4. The apparatus as claimed in claim 3, wherein said small-capacity base transceiver station comprises:

a first phase locked loop (PLL) synthesizer for synthesizing said primary frequency assignment (FA1) signal;

a second PLL synthesizer for synthesizing said multi-frequency assignment (FA) signals; and, an up-converter for modulating transmission data with said primary frequency assignment signal provided from said first PLL synthesizer, and for producing pilot signals corresponding to said multi-frequency assignment by modulating a signal, prior to radio frequency modulation, with said multi-frequency assignment signals provided from said second PLL synthesizer.

5. The apparatus as claimed in claim 4, wherein said small-capacity BTS is a pico BTS.

6. The apparatus as claimed in claim 4, wherein said second PLL synthesizer synthesizes said multi-frequency assignment signals in a time hopping manner.

7. The apparatus as claimed in claim 4, wherein said pilot signals from said up-converter are transmitted in a time division manner.

8. A method for transmitting a CDMA signal supporting a multi-frequency assignment (FAs) in a small-capacity base transceiver station (BTS) supporting only a primary frequency assignment (FA1) by producing a plurality of pilot signals corresponding to the multi-frequency assignment (FA), the BTS having a transmitter and a receiver, the method comprising the steps of:

(a) synthesizing in the transmitter the primary frequency assignment (FA1) signal by controlling a first phase locked loop (PLL);

(b) synthesizing in the transmitter the multi-frequency assignment (FA) signals by controlling a second phase locked loop (PLL);

(c) generating the pilot signals corresponding to the multi-frequency assignment using the multi-frequency assignment signals generated by the second PLL; and, (c) modulating the received CDMA signal with the primary frequency assignment signal generated by the first PLL.

9. The method as claimed in claim 8, wherein the small-capacity BTS is a pico base transceiver station.

10. The method as claimed in claim 8, wherein the multi-frequency assignment signals are synthesized in a time hopping manner.

11. The method as claimed in claim 8, wherein the pilot signals are transmitted in a time division manner.

12. The transmitter of claim 1, wherein said signal to be modulated has been routed separately from said modulated transmission data.

13. An apparatus for producing a plurality of pilot signals corresponding to a multi-frequency assignment (FA) to execute a hand-off in a pico base transceiver station (BTS) which only supports a primary frequency assignment (FA1) in a CDMA communication system which supports said multi-frequency assignment, said apparatus comprising:

a first phase locked loop (PLL) synthesizer having a first PLL for synthesizing said primary frequency assignment (FA1) signal by controlling said first PLL;

a second PLL synthesizer having a second PLL for synthesizing said multi-frequency assignment (FA) signals by controlling said second PLL; and, an up-converter for modulating transmission data with said primary frequency assignment signal provided from said first PLL synthesizer, and for producing pilot signals corresponding to said multi-frequency assignment by modulating a signal, prior to radio frequency modulation, with said multi-frequency assignment signals provided from said second PLL synthesizer to execute said hand-off in the pico BTS.

14. A base transceiver station (BTS) transmitter for producing a plurality of pilot signals corresponding to a multi-frequency assignment (FA) to execute a hand-off in a small-capacity BTS which only supports a primary frequency assignment (FA1) in a CDMA communication system which supports said multi-frequency assignment, said transmitter comprising:

a first phase locked loop (PLL) synthesizer having a first PLL for synthesizing said primary frequency assignment (FA1) signal by controlling said first PLL;

a second PLL synthesizer having a second PLL for synthesizing said multi-frequency assignment (FA) signals, in a time-hopping manner, by controlling said second PLL; and, an up-converter for modulating transmission data with said primary frequency assignment signal provided from said first PLL synthesizer to create modulated transmission data, and for producing pilot signals corresponding to said multi-frequency assignment by modulating a signal, prior to radio frequency modulation, with said multi-frequency assignment signals provided from said second PLL synthesizer, said signal to be modulated having been routed separately from said modulated transmission data.

* * * * *